Patented Nov. 4, 1924.

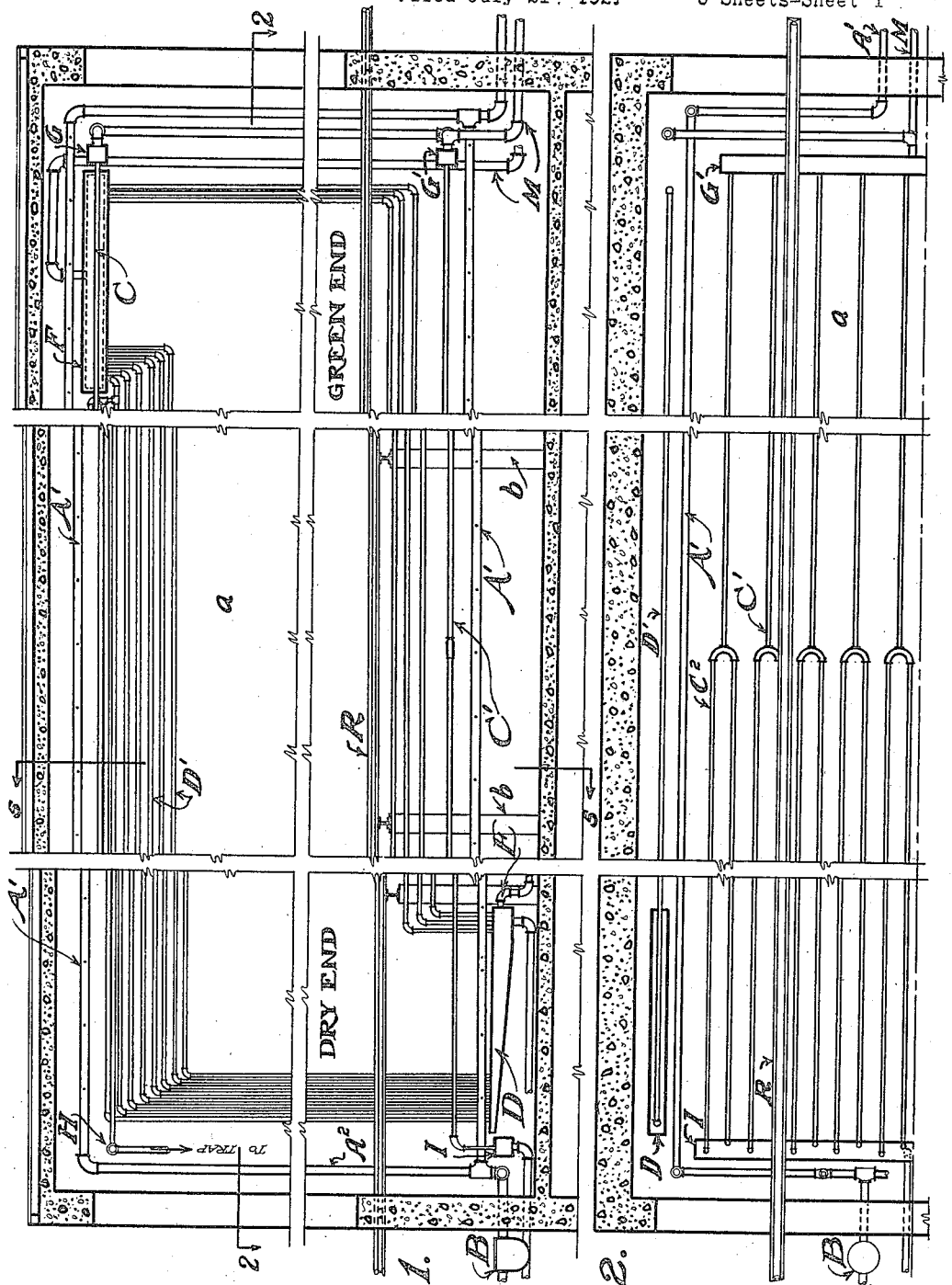

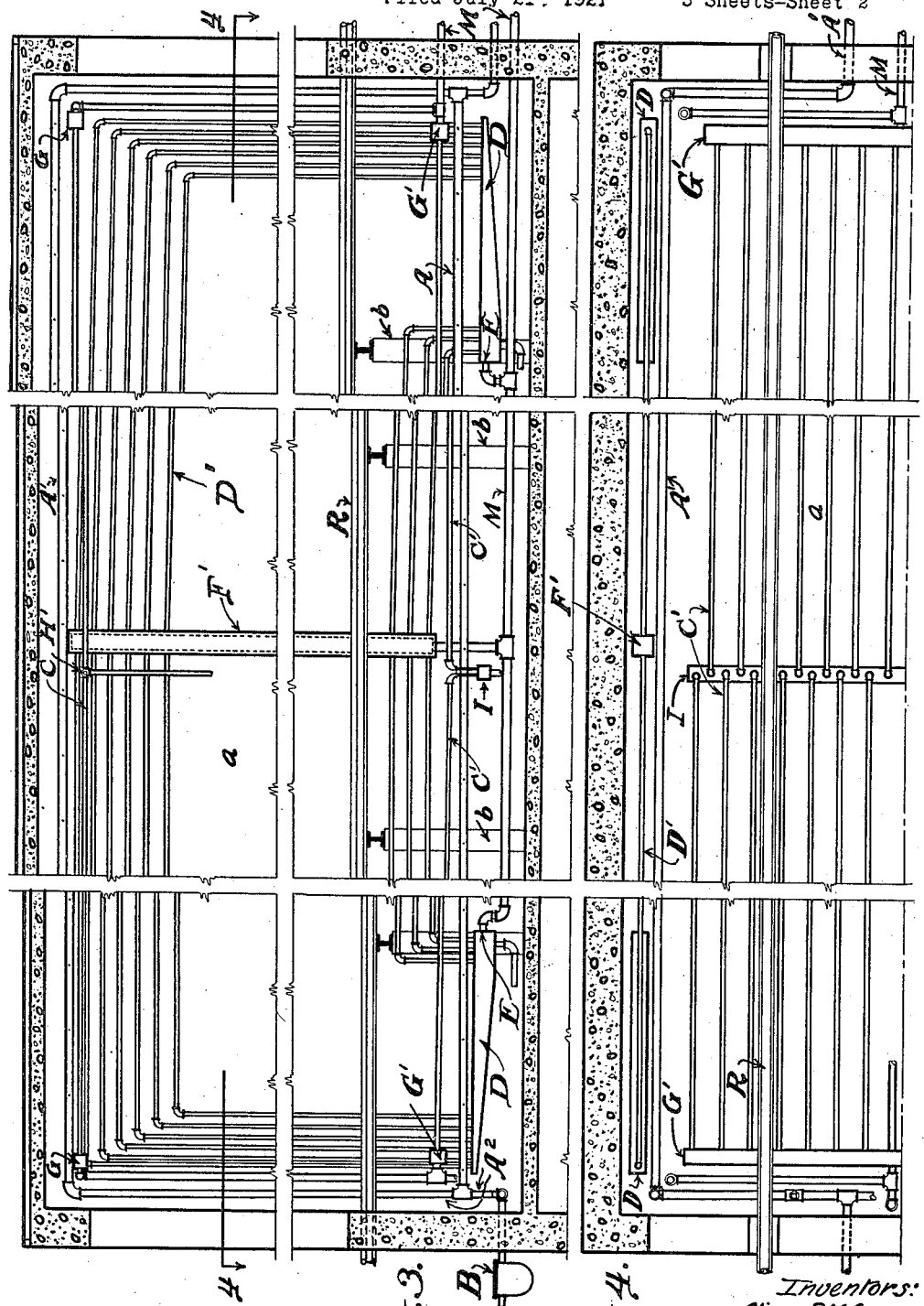

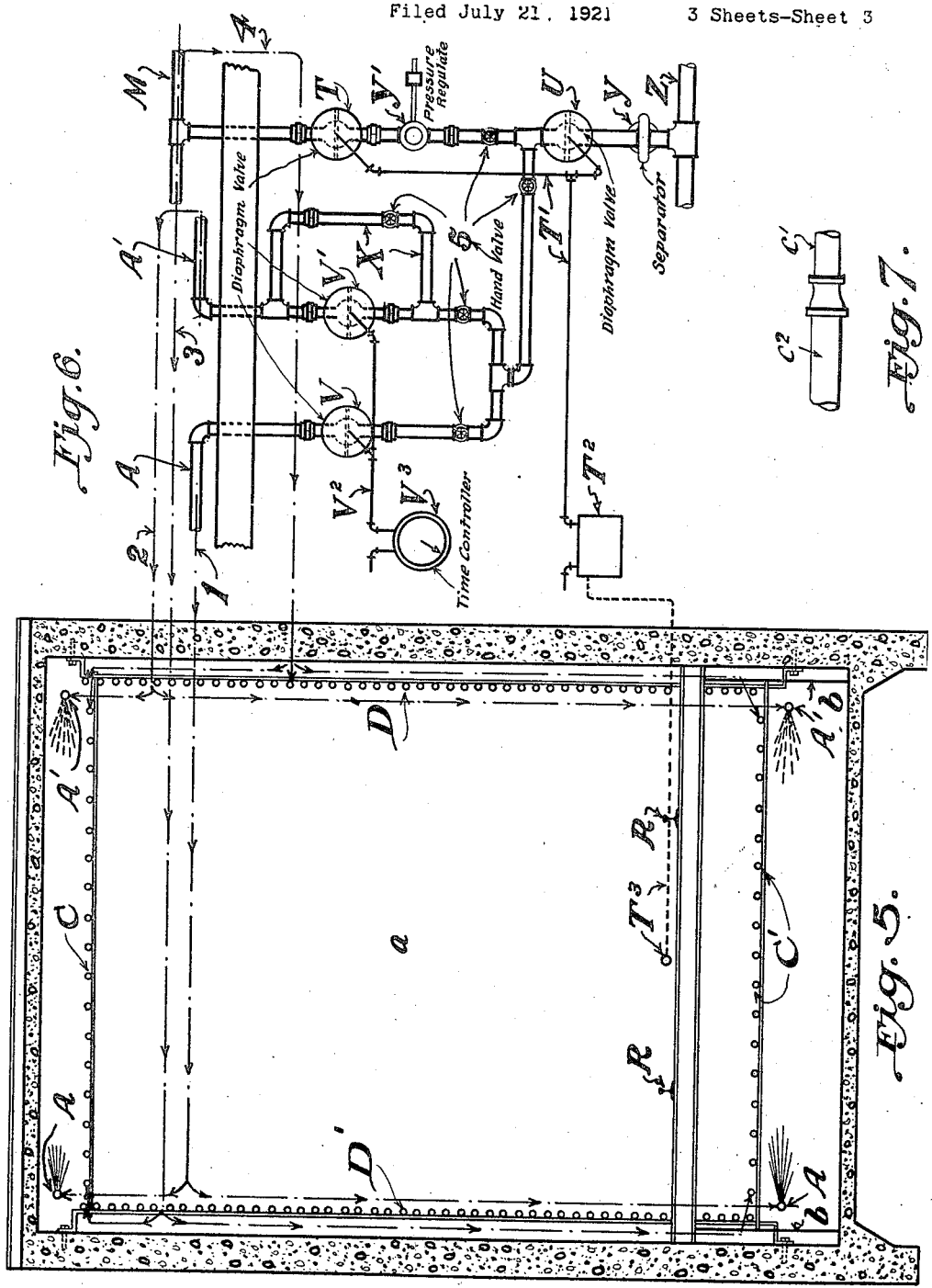

1,514,101

UNITED STATES PATENT OFFICE.

RALPH H. RAWSON, OF PORTLAND, OREGON, AND OLIVER P. M. GOSS, OF SEATTLE, WASHINGTON.

DRY KILN.

Application filed July 21, 1921. Serial No. 486,557.

*To all whom it may concern:*

Be it known that I, RALPH H. RAWSON, a citizen of the United States, and a resident of the city of Portland, county of Multnomah, and State of Oregon, and I, OLIVER P. M. Goss, a citizen of the United States, and a resident of the city of Seattle, county of King and State of Washington, have invented a certain new and useful Improvement in Dry Kilns, of which the following is a specification.

Our invention relates particularly to kilns designed for drying lumber products and in this connection has for its particular object the improvement of the methods of treatment and apparatus described in the Letters Patent of the United States to Harry Donald Tiemann, No. 1,268,180, dated June 4, 1918. Our practical experiments with the methods and means described in said Tiemann patent applied to the drying of lumber products of the Pacific Northwest have shown that they are incomplete and insufficient for the treatment of said lumber products in a commercial way. The object of our invention, stated in a general way, is to improve upon said Tiemann method and apparatus in the following particulars:

First, to provide means whereby the spray lines are kept free from condensation thereby preventing the spraying of the moisture upon the lumber stacked in the kiln. Condensation in the spray lines is unavoidable and therefore without efficient means for removing the condensation the drying process is greatly impeded.

Second, to provide means adapted to promote the maintenance of substantially equal temperatures thruout the length of the kiln.

We attain the first mentioned object by connecting the ends of the spray lines with means, such as a trap, for collecting and removing condensation; the condensation being discharged thru such means or carried back to a hot well to be used over again as may be deemed expedient. We furthermore provide spray pipes arranged in sets on opposite sides of the walls of the drying chamber, each set being controlled by a valve, and in connection therewith provide means operating said valves so as to throw one set of spray pipes out of action when the other set is thrown into action; and the said valve operating means may be further supplemented by time controlled automatic means whereby the valve operating means are automatically thrown into action.

We attain the second object by the following arrangements used singly or preferably in combination, namely:

(*a*) By providing heating coils having greater radiating surface at a point remote from the inlet of said heating fluid than at such inlet; and we also introduce the heating fluid at a point centrally between the ends of the drying chamber of the kiln.

(*b*) By providing supplemental heating coils at that point where the drying fluid circulated in the first mentioned or primary heating coils tends to attain a temperature relatively lower than the other heating coils in the drying chamber.

(*c*) By providing a drain header with which the heating coils are connected and by admitting heating fluid into such header above the level of collected condensation. In this way the drying process is greatly promoted and the results will be uniform and certain.

A further object of our invention is to provide simple devices which will efficiently operate to produce the results above mentioned and tend to generally promote the drying process.

Such devices are illustrated in the accompanying drawings, which diagrammatically represent a dry kiln provided with said devices, namely:

Fig. 1 is a longitudinal section thru our improved dry kiln;

Fig. 2 is a plan section taken on the plane represented by the lines 2—2 in Fig. 1;

Fig. 3 shows another diagrammatic section of a dry kiln embodying our improved means, the arrangement of which is somewhat different than as shown in Fig. 1;

Fig. 4 is a plan section taken on the plane indicated by the line 4—4 of Fig. 3;

Fig. 5 is a transverse section on the plane indicated by the lines 5—5 of Fig. 1;

Fig. 6 diagrammatically represents the valves controlling the two sets of spray pipes and the means for operating these valves so as to close the valve of one set of spray pipes when the valve of the other set is open; this figure also diagrammatically shows the temperature controller, or in other words, the valve whereby is controlled the amount of steam or other heating fluid admitted into the heating coils and; Fig. 7 shows a modification and detail of construction hereinafter described.

As will be noted, all the views are foreshortened, both vertically and horizontally, and the longitudinal sections also represent that the kiln has a slope towards its left end.

Referring to the drawings, the heating apparatus and devices for regulating the circulation are contained in a drying chamber, a. The lumber is piled on trucks (not shown) which run on rails R, supported by posts b, the lumber being piled flatwise or vertically as preferred.

Suspended from the side walls of the drying chamber are heating pipes D', into which is admitted live steam thru a drying header F, as in Fig. 1, or F' in Fig. 3, the steam coming from its source thru a steam main, as Z in Fig. 6, and thru pipes M. These pipes on the side walls terminate in drip headers, D, which are located at low points in the drying chamber at one or both ends. The condensed steam accumulates in these headers and may be drawn off by any convenient means.

Also suspended from the ceiling of the drying chamber are rows of additional heating pipes, C, which begin at an inlet header, G, and terminate in a drain header H as shown in Fig. 1, or by H' in Fig. 3. From these drain headers the condensation is piped out of the kiln into a trap or other means for removing condensation, not shown.

Located below the lumber pile or piles, are heating pipes C' and C² which have their beginning at headers G'. These pipes, C' and C², terminate in drain-headers I, from which the condensation is removed as mentioned above. The steam is admitted to the inlet header, G and G', thru pipes M, as described above.

If desired, live steam may be admitted into headers, D, at a point E which is just above the level of the condensation in such headers. This arrangement is adapted to raise the temperature at this end of the drying chamber and thus produce equal temperatures thruout its length.

In Fig. 2 is shown that the number of heating pipes C' is increased at such a point where the temperatures tend to be lower than at the inlet end, for example, as at C²; the increased heating surface tending to bring the temperature up and thereby equalizing the conditions thruout the length of the drying chamber. The same effect could also be obtained by coupling the pipes C' with pipes of larger cross section located at C², as illustrated by C³ in Fig. 7.

Arranged above and below the heating pipes D', are spray pipes, A on one side wall, and A' on the opposite side wall. These pipes emit steam at high pressure into the drying chamber. In case the lumber is piled flatwise, the direction of the steam jets is as indicated in Fig. 5, but if the lumber is vertically piled the courses of the lower pipes, A and A', may be given a quarter turn, so as to force the jets of steam upward over the heating pies D'. Under such circumstances the upper course of spray pipes should be turned off to prevent the formation of counter currents.

The spray pipes A and A' terminate at a low point in the drying chamber and are piped to a trap B located outside the chamber. The trap B may be of such construction that the condensation is removed automatically as it accumulates in the trap or drop pipe, A², without wasting the steam. There being several well known commercial makes of traps of this type, no description is necessary here. It is to be noted that the steam spraying orifices of the spray pipes A and A' are located in the sides of the latter only, thus leaving the bottom sections of said spray pipes unperforated, so that such bottom sections constitute troughs leading to said trap B. Hence the steam vapors are released through said orifices, while the condensations collecting in said spray pipes are conducted by said troughlike pipe portions to said trap.

Located without the drying chamber are means for controlling the temperature in the drying chamber, and for controlling the steam entering the spray pipes A and A', see Figs. 5 and 6.

V is a direct acting valve so constructed that a spring causes the valve to remain open unless pressure is exerted on the valve stem. V' represents a reverse acting valve of such construction that a spring causes it to remain closed until pressure is exerted on its stem. A time arrangement, indicated by V³, Fig. 6, is provided to operate at certain intervals to admit fluid under pressure thru pipe V² on the stems of valves V and V' and thus, by reason of the construction of said valves as mentioned above, V is closed and V' is opened. 5 are hand valves.

T, Fig. 6, is a valve with a diaphragm top which is controlled by a fluid under pressure. A thermostatic fluid is contained in a tube, T³, Fig. 5, which terminates in a time device as indicated diagrammatically by T². The thermostatic fluid, expanding with a rise in temperature within the drying chamber, admits fluid under pressure into tube T' which exerts pressure on the top of diaphragm valve T, and in this way regulates the amount of steam passing thru M into heating pipes C, C', C² and D'.

In Fig. 6 Y shows diagrammatically, a steam separator which prevents dirt and scale from passing into the pipes and lodging in valves U, V, V' and T. Y' indicates diagrammatically, a pressure regulator which makes it possible to carry a constant steam pressure in the heating coils.

U is an auxiliary cut off valve, which may be used to shut off all steam connections to the drying chamber. The described valves are easily obtainable commercially and therefore description of their construction and operation is unnecessary. See for example catalogue 460 of C. J. Tagliabue Company.

In further explanation of the arrangement of steam and spray pipes in Figs. 5 and 6, 1 indicates, diagrammatically, that the steam passes thru valve V to the spray pipes A on one side of the drying chamber; 2, that the steam passes thru V' or X to the spray pipes A' on the opposite wall; 3 connects with the heating coils C, C', and D' on one side of the drying chamber, and 4 connects with C, C' and coils D' on the opposite wall thru their respective headers G, G', and F and F'.

We claim:

1. In a dry kiln, a horizontally disposed steam spray pipe sloped to drain the condensation within it to a low point, and a trap connected with said low point adapted to remove the condensation automatically as it accumulates; the spray orifices of said spray pipe being so located as to leave an unperforated trough-like portion at the bottom of the spray pipe, whereby the vapors within the latter are released through said orifices while the condensation collecting in the spray pipe is conducted by the trough-like portion of the latter to said trap.

2. In a dry kiln, spray pipes arranged in sets, each set controlled by a valve, and means adapted to cause the opening of the valves of one set of spray pipes simultaneously with the closing of the valves of the other set.

3. In a dry kiln, spray pipes arranged in sets, each set controlled by a valve, and time controlled, automatic means adapted to cause the opening of the valves of one set of spray pipes simultaneously with the closing of the valves of the other set.

4. In a dry kiln, spray pipes arranged to drain to a low point, said spray pipes being arranged in sets, each set controlled by a valve, a trap of the character described connected with said low point, and means adapted to cause the opening of the valves of one set of spray pipes simultaneously with the closing of the valves of the other set.

5. In a dry kiln, spray pipes arranged to drain to a low point, said spray pipes being arranged in sets, each set controlled by a valve, a trap of the character described connected with said low point, and time controlled, automatic means adapted to cause the opening of the valves of one set of spray pipes simultaneously with the closing of the valves of the other set.

6. In a dry kiln, primary heating coils adapted to provide greater radiating surface at a point remote from the inlet of the heating fluid than at such inlet, and supplemental heating coils located at a point where the heating fluid in the primary heating coils tends to attain a temperature relatively lower than at other points in the dry kiln.

7. In a dry kiln, heating coils, a drain header with which the heating coils are connected, and a connection from the source of heating fluid entering said header above the level of condensation therein.

8. In a dry kiln, heating coils, and means for automatically regulating the amount of heating fluid admitted into said heating coils, thereby to regulate their temperature, and thereby control the humidity.

9. In a dry kiln, heating coils, means for automatically regulating the amount of heating fluid admitted into said heating coils, thereby to regulate their temperature, and thereby control the humidity, a drain header with which the heating coils are connected, and a connection from the source of heating fluid entering said header above the level of condensation therein.

10. In a dry kiln, spray pipes arranged to drain to a low point, a trap of the character described connected with said low point, and heating coils.

11. In a dry kiln, spray pipes arranged to drain to a low point, a trap of the character described connected with said low point, and heating coils adapted to provide greater radiating surface at a point remote from the inlet of the heating fluid than an at such inlet.

12. In a dry kiln, spray pipes arranged to drain to a low point, a trap of the character described connected with said low point, primary heating coils adapted to provide greater radiating surface at a point remote from the inlet of the heating fluid than at such inlet, and supplemental heating coils located at a point where the heating fluid in the primary heating coils tends to attain a temperature relatively lower than at other points in the dry kiln.

13. In a dry kiln, spray pipes arranged to drain to a low point, a trap of the character described connected with said low point, heating coils, and means for automatically regulating the amount of heating fluid admitted into said heating coils, thereby to regulate their temperature, and thereby control the humidity.

14. In a dry kiln, spray pipes arranged to drain to a low point, a trap of the character described connected with said low point, heating coils, a drain header with which the heating coils are connected, and a connection from the source of heating fluid entering said header above the level of condensation therein.

15. In a dry kiln, spray pipes arranged to drain to a low point, a trap of the character described connected with said low point, heating coils, means for automatically regulating the amount of heating fluid admitted into said heating coils, thereby to regulate their temperature, and thereby control the humidity, a drain header with which the heating coils are connected, and a connection from the source of heating fluid entering said header above the level of condensation therein.

16. In a dry kiln, spray pipes arranged to drain to a low point, a trap of the character described connected with said low point, means adapted to cause the opening of the valves of one set of spray pipes simultaneously with the closing of the valves of the other set, heating coils, means for automatically regulating the amount of heating fluid admitted into said heating coils, thereby to regulate their temperature, and thereby control the humidity a drain header with which the heating coils are connected, and a connection from the source of heating fluid entering said header above the level of condensation therein.

17. In a dry kiln, spray pipes arranged to drain to a low point, said spray pipes being arranged in sets, each set controlled by a valve, a trap of the character described connected with said low point, means adapted to cause the opening of the valves of one set of spray pipes simultaneously with the closing of the valves of the other set, primary heating coils adapted to provide greater radiating surface at a point remote from the inlet of the heating fluid than at such inlet, supplemental heating coils located at a point where the heating fluid in the primary heating coils tends to attain a temperature relatively lower than at other points in the dry kiln, means for automatically regulating the amount of heating fluid admitted into said heating coils, thereby to regulate their temperature, and thereby control the humidity, a drain header with which the heating coils are connected, and a connection from the source of heating fluid entering said header above the level of condensation therein.

18. In a dry kiln, spray pipes arranged to drain to a low point, said spray pipes being arranged in sets, each set controlled by a valve, a trap of the character described connected with said low point, time controlled, automatic means adapted to cause the opening of the valves of one set of spray pipes simultaneously with the closing of the valves of the other set, primary heating coils adapted to provide greater radiating surface at a point remote from the inlet of the heating fluid than at such inlet, supplemental heating coils located at a point where the heating fluid in the primary heating coils tends to attain a temperature relatively lower than at other points in the dry kiln, means for automatically regulating the amount of heating fluid admitted into said heating coils, thereby to regulate their temperature, a drain header with which the heating coils are connected, and a connection from the source of heating fluid entering said header above the level of condensation therein.

19. In a dry kiln, a system of spray pipes, connected to a source of drying fluid, and time controlled means for causing the automatic reversal of the direction of steam sprays in the kiln by closing one valve and opening the other valve simultaneously.

20. In a dry kiln, a system of spray pipes connected at separated points to a source of drying fluid, and time controlled means for causing the automatic reversal of the direction of the steam sprays in the kiln by closing one valve and opening the other valve simultaneously.

21. In a dry kiln, a system of spray pipes connected at separated points to a source of drying fluid, a valve in each of said connections, and time controlled, automatic means for opening and closing said valves alternately with each other.

22. In a dry kiln, a system of spray pipes, connected at separated points to a source of drying fluid, a valve in each of said connections, time controlled, automatic means for opening and closing said valves alternately with each other, auxiliary cut off valves in said connections, and a by-pass around one of said valves.

RALPH H. RAWSON.
OLIVER P. M. GOSS.